3,446,694
NON-DISCOLORING COMPOSITE POLY-
URETHANE FOAM AND SKIN-FORM-
ING MATERIAL
John D. Hoskinson, Cuyahoga Falls, and Monte H. York, Akron, Ohio, assignors to The Goodyear Tire & Rubber Company, Akron, Ohio, a corporation of Ohio
No Drawing. Filed Jan. 3, 1966, Ser. No. 517,925
Int. Cl. B32b 27/40, 5/18, 3/26
U.S. Cl. 161—160  5 Claims This invention relates to a method of producing a polyurethane foam composite with a skin-forming material whereby the skin-forming material is non-discoloring, and to said composite.

Polyurethane foams are used extensively to make seat cushions, arm rests and other articles having a skin of polyvinyl chloride or a terpolymer of acrylonitrile, butadiene and styrene. It has been known for some time that the polyurethane foam caused the skin material such as polyvinyl chloride or the terpolymer of acrylonitrile, styrene, and a conjugated diene of about 4 to 8 carbon atoms, for instance, butadiene, to become discolored. Consequently the seat cushions and related articles have usually been of a dark color to hide the discoloration occasioned by the polyurethane foam.

Therefore, an object of this invention is to provide a method for making polyurethane foam composites with materials such as polyvinyl chloride and the terpolymer of acrylonitrile, butadiene and styrene which does not discolor due to the action of the polyurethane foam upon the other material.

This object may be accomplished by compositing a polyurethane foam which contains a non-staining catalyst in contact with the other material such as that of the skin. The polyurethane foam may be made either by the one-shot or the prepolymer method utilizing a reactive hydrogen containing material having a molecular weight in excess of about 600 and preferably 1500 to 3500 with an organic polyisocyanate in the presence of a foam generating substance together with a catalyst of the nature hereinafter disclosed.

Representative of the many reactive hydrogen containing materials are the broad classes of polyester polyols, polyether polyols, polyester amides, hydroxyl terminated hydocarbons and the hydroxyl terminated polycarbonates. Representative members of these are adipates of ethylene glycol, propylene glycol, butane-diol and glycerol; polypropylene ether polyol containing 2, 3, 4 to 8 hydroxyls, ethylene oxide or propylene oxide adducts of polydienes such as butadiene or isoprene or the hydrogenated adduct and the reaction product of a phosgenation product of a polyether glycol and a monomeric polyol.

The organic polyisocyanates useful in this invention are any of those useful for making foam. The preferred ones are toluene diisocyanate, methylene bis-(phenyl isocyanate) and the polymethane poly(arylene isocyanate).

To accelerate the reaction of the reactive hydrogen containing material with the polyisocyanate a tin catalyst or accelerator may be utilized. The nature of these materials are set forth in U.S. Patent 3,194,770 with the preferred metal catalysts being dibutyl tin dilaurate and tin dioctate.

The non-staining catalysts have the generic formula

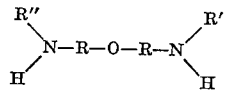

where R is an alkylene radical and R′ and R″ are alkyl radicals, said alkylene containing from 2 to about 10 carbon atoms and the alkyl radical containing from 1 to about 10 carbon atoms.

Representative of the non-staining catalysts useful in this invention is 2,2′-oxy-bis-(N,N′-dimethylethylamine). This catalyst may be utilized in about 0.05 to 0.5 part and preferably 0.1 to 0.2 part per hundred parts of reactive hydrogen containing material. Preferably the amine catalyst is added to the reactive hydrogen containing material prior to its reaction with the isocyanate or at the time it is mixed with the isocyanate. Alternatively in the one-shot system the reactive hydrogen containing material, the polyisocyanate, amine catalyst, tin accelerator and the foam effecting agent, either water or a low boiling inert material such as methylene chloride or fluorinated hydrocarbon may be added simultaneously to the mixing head and incorporated to form the polyurethane foamable mixture which is allowed to foam. Normally, at least about 1 mol to about 2 mols of organic polyisocyanate is used for each mol of reactive hydrogen containing material with the amount of blowing agent used being determined by the foam density desired.

The other laminate materials are the well known plasticized polyvinyl chlorides normally used in vacuum forming to make shaped covers for seat cushions, arm rests and related articles. Also, the terpolymers of acrylonitrile, butadiene and styrene which are utilized in making film and sheet material for use in seat cushions and related articles may be utilized.

The other laminate materials can be shaped in the conventional manner, for example, vacuum form, rotary casting or slush molding.

The following representative examples illustrate a method of practicing this invention where all parts are by weight unless otherwise indicated.

EXAMPLE I

A commercial clear plasticized polyvinyl chloride sheet suitable for an automotive crash pad skin was vacuum formed into the contour of a seat cushion.

Then a polyurethane foamable reaction mixture was made by first mixing 100 parts of a mixed polypropylene ether glycoltriol, 4 parts of water, 0.5 part N-ethyl morpholine, 0.15 part stannous octoate, 0.15 part of 70% aqueous solution of 2,2′-oxy-bis-(N,N′-dimethylamine) and 0.50 part of Freon 11 and then mixing the first mixture with 48.8 parts of toluene diisocyanate. This polyurethane foamable reaction mixture was poured in the vacuum-formed polyvinyl chloride seat cushion skin and allowed to foam while the skin was retained in a retaining mold having a flat floating lid. After standing overnight the seat cushion was removed from the mold. On standing, the polyvinyl chloride skin did not exhibit the familiar discoloration caused by the commercial polyurethane foams.

EXAMPLE II

A commercial sheet of a terpolymer of butadiene, acrylonitrile and styrene made according to the teachings of U.S. 3,118,854 was shaped into a seat cushion cover. Then a polyurethan foamable reaction mixture containing 2,2′-oxy-bis-(N,N′-dimethylethylamine) as a catalyst was poured into the skin and allowed to foam to give a seat cushion.

What is claimed is:

1. A composite comprising a first material selected from the class consisting of a plasticized polyvinyl chloride and a terpolymer of acrylonitrile, styrene and a conjugated diene having 4 to 8 carbon atoms in contiguous relationship with polyurethane foam, said polyurethane foam consisting essentially of the reaction product of a reactive hydrogen containing material of at least about 600 molecular weight, an organic polyisocyanate, a foam effecting agent and a catalyst having the formula

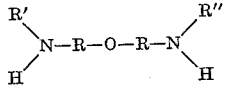

where R is alkylene radical containing from 2 to about 10 carbon atoms and R' and R'' are alkyl radicals containing from 1 to about 10 carbon atoms.

2. The composite of claim 1 wherein the catalyst is 2,2'-oxy-bis-(N,N'-dimethylethylamine).

3. The composite of claim 1 wherein the first material is a plasticized polyvinyl chloride.

4. The composite of claim 1 wherein the first material is a terpolymer of acrylonitrile, styrene and a conjugated diene having 4 to 8 carbon atoms.

5. The composite of claim 1 wherein the polyurethane foam is made from a polyether polyol.

References Cited
UNITED STATES PATENTS 3,170,832  2/1965  Wilson et al. _____ 161—190
3,293,108  12/1966  Nairn et al. _____ 161—160

ROBERT F. BURNETT, *Primary Examiner.*

W. J. VAN BALEN, *Assistant Examiner.*

U.S. Cl. X.R.

161—190, 256; 260—2.5; 264—45, 47, 54